United States Patent
Smith

(10) Patent No.: US 7,735,582 B2
(45) Date of Patent: Jun. 15, 2010

(54) INSERTABLE DEVICES FOR RETENTION SYSTEMS, STRUCTURES FOR ATTACHMENT AND METHODS OF USE

(75) Inventor: Redd H. Smith, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/032,428

(22) Filed: Feb. 15, 2008

(65) Prior Publication Data

US 2009/0205870 A1    Aug. 20, 2009

(51) Int. Cl.
*E21B 21/00* (2006.01)
*E21B 10/00* (2006.01)
*E21B 10/36* (2006.01)

(52) U.S. Cl. .................. 175/340; 175/393; 175/426; 175/429

(58) Field of Classification Search .............. 175/340, 175/339, 393, 417, 418, 429, 426
See application file for complete search history.

(56) References Cited

U.S. PATENT DOCUMENTS

| | | | | |
|---|---|---|---|---|
| 3,129,777 A | * | 4/1964 | Haspert | 175/340 |
| 3,198,560 A | * | 8/1965 | Collins | 285/288.11 |
| 3,900,220 A | * | 8/1975 | Buchser | 285/148.23 |
| 4,082,015 A | | 4/1978 | Craig | |
| 4,323,130 A | | 4/1982 | Dennis | |
| 4,407,378 A | * | 10/1983 | Thomas | 175/340 |
| RE32,036 E | | 11/1985 | Dennis | |
| 4,567,954 A | | 2/1986 | Voight, III et al. | |
| 4,582,149 A | | 4/1986 | Slaughter, Jr. | |
| 4,759,415 A | | 7/1988 | Pessier | |
| 4,793,426 A | | 12/1988 | Millsapps, Jr. | |
| 5,495,903 A | | 3/1996 | Griffin et al. | |
| 5,678,645 A | | 10/1997 | Tibbitts et al. | |
| 5,906,245 A | | 5/1999 | Tibbitts et al. | |
| 6,227,316 B1 | * | 5/2001 | Rohde | 175/340 |
| 6,311,793 B1 | | 11/2001 | Larsen et al. | |
| 6,585,063 B2 | * | 7/2003 | Larsen | 175/57 |
| 2008/0121434 A1 | * | 5/2008 | Wells et al. | 175/340 |

OTHER PUBLICATIONS

PCT International Search Report for International Application No. PCT/US2009/034259, mailed Sep. 25, 2009.

* cited by examiner

*Primary Examiner*—Jennifer H Gay
*Assistant Examiner*—Yong-Suk Ro
(74) *Attorney, Agent, or Firm*—TraskBritt

(57) ABSTRACT

Insertable devices include a body and at least one substantially circumferential groove in an outer side surface of the body. An aperture in a receiving device comprises at least one annular recess extending radially into a sidewall thereof. At least one resilient split ring fits partially into both the at least one substantially circumferential groove of the insertable device and the at least one annular recess in the aperture. Methods of inserting the insertable device into a receiving device and of removing the insertable device from a receiving device are also disclosed.

27 Claims, 6 Drawing Sheets

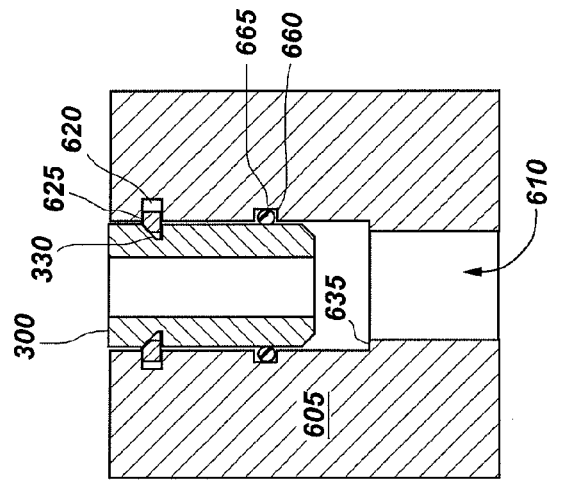
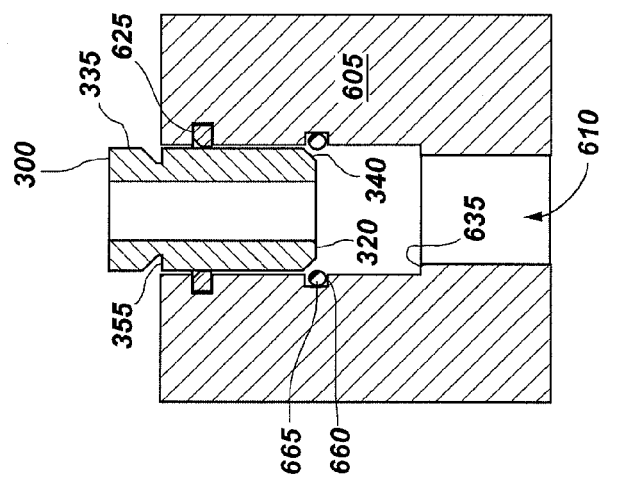
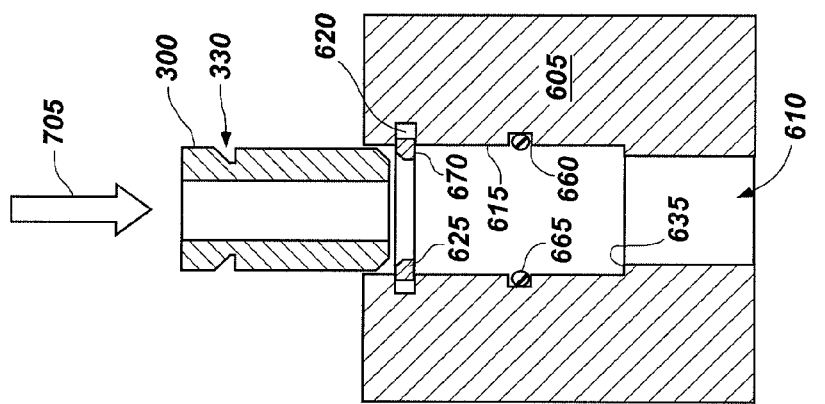

INSERTABLE DEVICES FOR RETENTION SYSTEMS, STRUCTURES FOR ATTACHMENT AND METHODS OF USE

TECHNICAL FIELD

The present invention relates generally to retention systems. More particularly, embodiments of the present invention relate to insertable devices and methods of securing insertable devices to receiving devices. In some embodiments, the insertable device may be configured as a nozzle insert and the receiving device as an earth-boring tool.

BACKGROUND

Earth-boring bits are commonly used for drilling bore holes, or wells, in subterranean formations. Conventional rotary earth-boring bits are typically classified into two types: roller cone bits and fixed-cutter bits (often referred to as a "drag" bit). A conventional roller cone bit has one or more generally conic roller cones rotatably mounted on the bit body. The roller cones have cutting teeth and/or inserts extending therefrom and rotation of the bit body rotates the cones so that the cutting teeth and/or inserts crush and gouge the formation. Conventional drag bits typically have no moving parts and include cutting elements which scrape across and shear away the underlying formation material.

The cutting structures of both of these types of bits are cooled and cleaned by drilling fluid provided to the bit surface during the normal drilling operation. The drilling fluid is conventionally pumped down a drill string having the bit at the end thereof, and out through a plurality of apertures in the bit face. The drilling fluid flows out the plurality of openings to the bottom of the borehole and carries the removed formation material, entrained in the drilling fluid, away from the surface of the formation being drilled and back up the hole on the outside of the drill string.

In some applications, nozzles are inserted and secured into the apertures to direct the drilling fluid and/or to provide high velocity jets of drilling fluid. Typically, tungsten carbide nozzles having specific flow diameters are employed. The ability to replace these nozzles in a drill bit is desirable in order to enable altering the hydraulic characteristics for differing service conditions.

Conventional roller cone bits may use a cylindrical nozzle insert with a constant outer diameter, as shown in FIG. 1. For securing the nozzle insert 100, the aperture 110 in the bit body may have a retention ring groove 120 machined near the bit face 130. The nozzle insert 100 is placed in the aperture 110 and secured with a conventional circular metal spring retention ring 140. One problem with exposing the retention ring 140, however, is the potential for erosion of the retention ring 140 by impingement of the high velocity drilling fluid. Although there is less potential for erosion caused by so-called "splash-back" of the drilling fluid off the adjacent borehole surface in a conventional rotary cone bit where the exit position of the nozzle insert 100 is relatively distant from the borehole surface, the retention ring 140 can still be subject to the erosive forces of the high velocity drilling fluid and entrained formation particulates.

A conventional fixed-cutter, or drag, bit on the other hand, typically cannot employ an exposed conventional retaining ring as a nozzle insert retention method because the exit position of the nozzle insert is relatively close to the borehole surface. An exposed retaining ring would thus be exposed to severe splash-back of the high velocity drilling fluid, eroding the retaining ring and eventually causing failure thereof and loss of the nozzle insert. Therefore, as illustrated in FIG. 2, a nozzle insert 200 for a fixed-cutter bit typically has a thread 210 formed into the insert material. A complementary thread 220 is also formed in the aperture 230 when the bit body is formed, thus allowing the nozzle insert 200 to be screwed into the aperture 230. Although the threaded retention system shown in FIG. 2 is generally effective, the cost of forming the complementary thread pairs is relatively expensive due to the difficulty to machine material of the inserts, generally tungsten carbide.

There is a continuing need in the art for better and more cost-efficient techniques for securing insertable devices, such as nozzle inserts, within an aperture in a receiving device, such as an earth-boring drill tool or other downhole tool, which are adapted for substantially protecting the retention mechanism from an external environment, and in which the retention mechanism is relatively easily engaged and disengaged.

BRIEF SUMMARY OF THE INVENTION

Various embodiments of the present invention are directed toward an insertable device for lockable attachment to a receiving device. The insertable device may include a body extending along a longitudinal axis and comprising a first longitudinal end and an opposing second longitudinal end. An outer side surface between the first longitudinal end and the second longitudinal ends includes at least one substantially circumferential groove. The at least one substantially circumferential groove may comprise a first, substantially frustoconical surface sloping in the direction of the first longitudinal end and forming an acute angle with the longitudinal axis, and a second surface substantially transverse to the longitudinal axis. In one non-limiting embodiment, the insertable device may comprise a nozzle insert for an earth-boring tool.

In additional embodiments the present invention includes a structure for lockable attachment of an insertable device to a receiving device. The structure may include an aperture on a receiving device for receiving the insertable device and at least one resilient split ring. The aperture may include a sidewall and at least one annular recess extending radially from the sidewall. The at least one resilient split ring may be sized and configured, in a substantially radially uncompressed state, to fit partially into the at least one annular recess in the aperture as well as partially into the at least on substantially circumferential groove in the insertable device. In one non-limiting embodiment, the insertable device may comprise a nozzle insert for an earth-boring tool.

In other embodiments, the present invention includes methods for inserting an insertable device into a receiving device. The method may include positioning at least one resilient split ring at least partially into at least one annular recess in a sidewall of an aperture in the receiving device. An insertable device may be positioned into the aperture through the at least one split ring to expand the at least one split ring, and at least one circumferential groove in the outer side surface of the insertable device may be aligned with the at least one resilient split ring such that the expanded at least one resilient split ring at least partially contracts into the at least one substantially circumferential groove. In one non-limiting embodiment, the method may comprise inserting a nozzle insert into an aperture in an earth-boring tool.

In yet additional embodiments, the present invention includes methods for removing an insertable device from a receiving device. An insertable device retained in an aperture with at least one resilient split ring extending into both at least one substantially circumferential groove in the outer side surface thereof and at least one aligned annular recess in the aperture may be advanced farther into the aperture until the insertable device is located completely below the one or more resilient split rings positioned at least partially in the at least one annular recess in a sidewall of the aperture. The at least one resilient split rings may be removed from the aperture, and the insertable device may be removed from within the aperture. In one non-limiting embodiment, the removal method comprises removing a nozzle insert from an aperture in an earth-boring tool.

BRIEF DESCRIPTION OF THE DRAWINGS

FIGS. 7A-7C are cross-sectioned views depicting the insertion of an insertable device into an aperture of a receiving device according to one embodiment.

DETAILED DESCRIPTION

By way of example and not limitation, embodiments of the present invention are described herein in terms of an insertable device embodied as a nozzle insert and a receiving device embodied as an earth-boring tool. As used herein, the term "device" is employed in a non-limiting sense to denote an element or member, and not as requiring multiple components or an assembly. The illustrations presented herein are, in some instances, not actual views of any particular nozzle insert, aperture, or drill bit, but are merely idealized representations which are employed to describe the present invention. Additionally, elements common between figures may retain the same numerical designation.

In the following description, certain terminology is used to describe certain features of one or more embodiments of the invention. For instance, the term "earth-boring tool" includes roller cone and fixed cutter bits, as well as core bits, eccentric bits, bicenter bits, reamers, hole openers, back reamers and any other tool useful in drilling or expanding a borehole in a subterranean formation or in a component of a tubular string disposed in a borehole. Embodiments of the present invention are directed to a removable and replaceable insertable device having a variety of applications, one non-limiting example of which is in earth-boring tools. One embodiment of the present invention comprises a removable and replaceable nozzle insert for an earth-boring tool.

Figure 1:
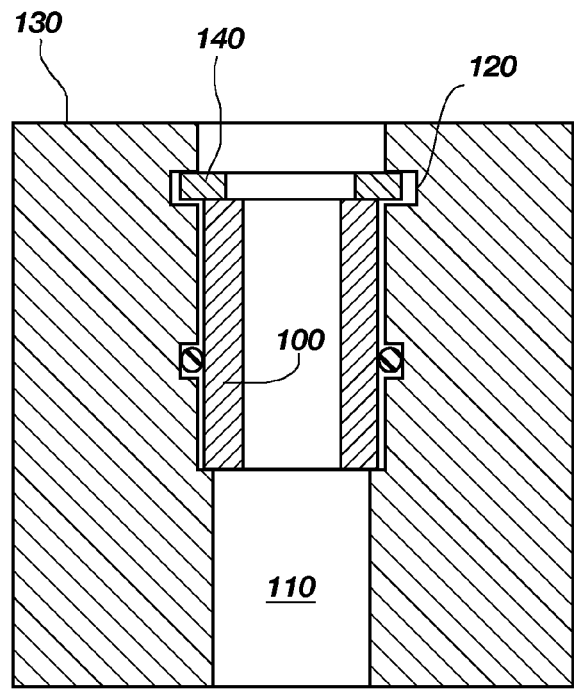
FIG. 1 is a cross-section view illustrating a prior art retention system for retaining a nozzle insert in a conventional roller cone bit.
Figure 2:
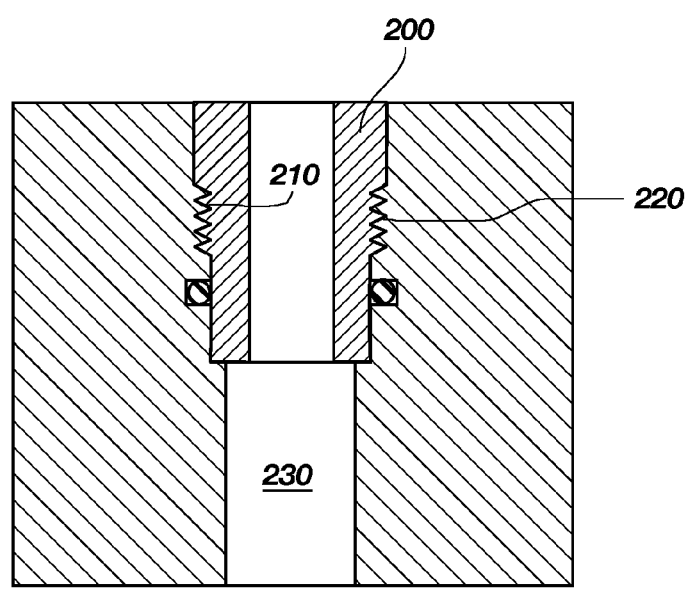
FIG. 2 is a cross-section view illustrating a prior art retention system for retaining a nozzle insert in a conventional fixed-cutter bit.
Figure 3:
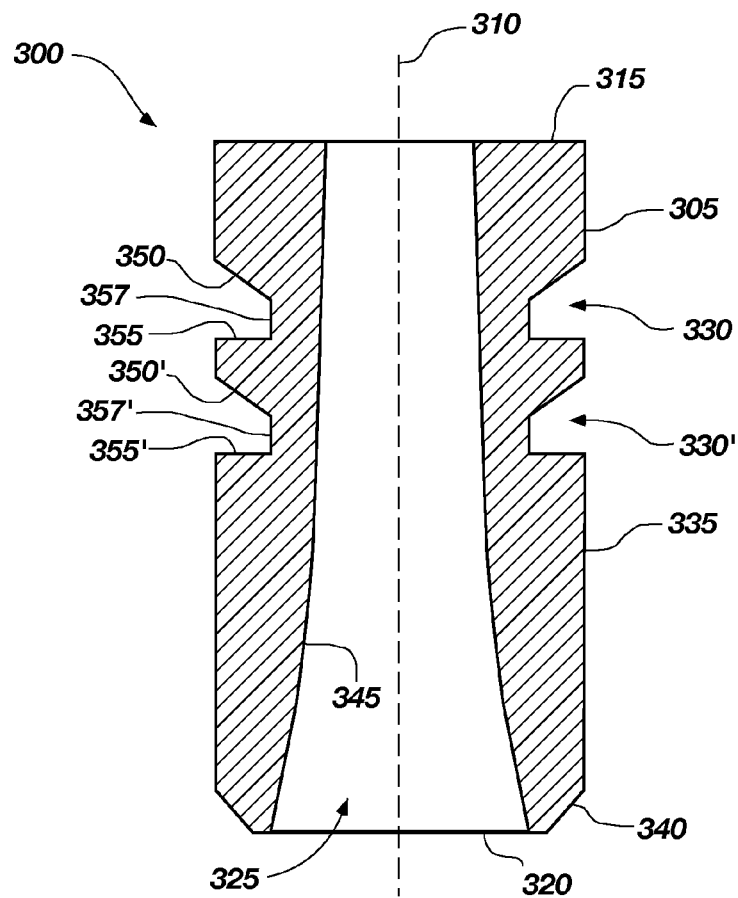
FIG. 3 illustrates a cross-section of an insertable device configured as a nozzle insert according to one embodiment of the present invention.

FIG. 3 depicts a cross-section of an insertable device configured as a nozzle insert 300 according to one embodiment of the invention. The nozzle insert 300 may comprise a body 305 extending generally along a longitudinal axis 310 and including a first end 315 and a second end 320. At least one aperture 325 may be positioned in the body 305 and may intersect a portion of the first end 315 and the second end 320. Additionally, a substantially circumferential, annular cutout or groove 330 may be positioned in an outer side surface 335 between the first end 315 and the second end 320. In some embodiments, the second end 320 of the body 305 may include a bevel 340 at an outer edge thereof.

In embodiments in which the insertable device comprises a nozzle insert 300, the body 305 may comprise an erosion-resistant material such as, for instance, tungsten carbide. It is also contemplated, however, that the body 305 may comprise, for example, a variety of materials such as a ceramic, a metal or metal alloy such as steel lined within the at least one aperture 325 with an erosion-resistant material, a plastic, a fiber-matrix composite, or a particle-matrix composite material comprising a plurality of hard particles infiltrated with a metallic binder. By way of example and not limitation, the hard particles may comprise a material selected from diamond, boron carbide, boron nitride, aluminum nitride, and carbides or borides of the group consisting of W, Ti, Mo, Nb, V, Hf, Zr, Si, Ta, and Cr, and the metallic binder or matrix material may be selected from the group consisting of iron-based alloys, nickel-based alloys, cobalt-based alloys, titanium-based alloys, aluminum-based alloys, iron and nickel-based alloys, iron and cobalt-based alloys, and nickel and cobalt-based alloys. As used herein, the term "metal-based alloy" (where metal is any metal) means commercially pure metal in addition to metal alloys wherein the weight percentage of a primary metal in the alloy is greater than or equal to the weight percentage of all other components of the alloy individually. In some embodiments, the body 305 may have a cross-sectional shape which is generally circular (FIGS. 5A-5D), thus forming a generally cylindrical body 305.

Figure 4:
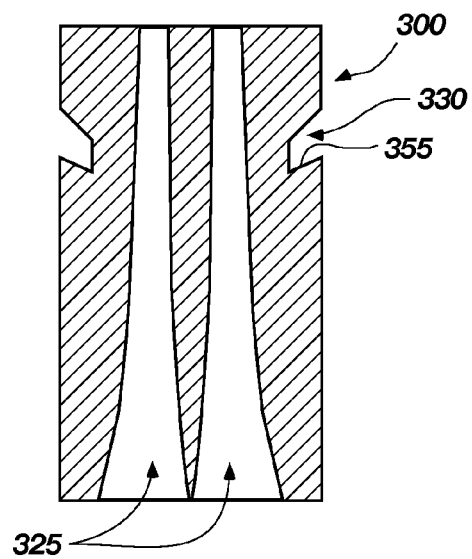
FIG. 4 illustrates a cross-section of another embodiment of an insertable device configured as a nozzle insert.
Figure 5A:
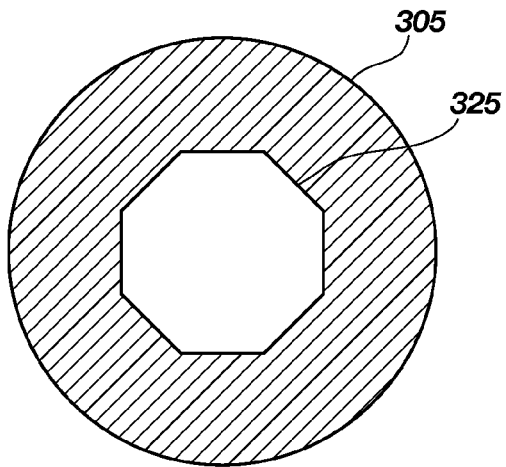
FIGS. 5A-5D illustrate some non-limiting embodiments of various nozzle insert body cross-sectional configurations and aperture cross-sectional configurations.
Figure 5B:
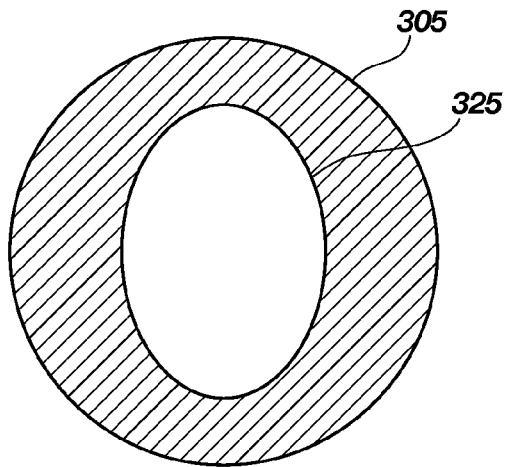
Figure 5C:
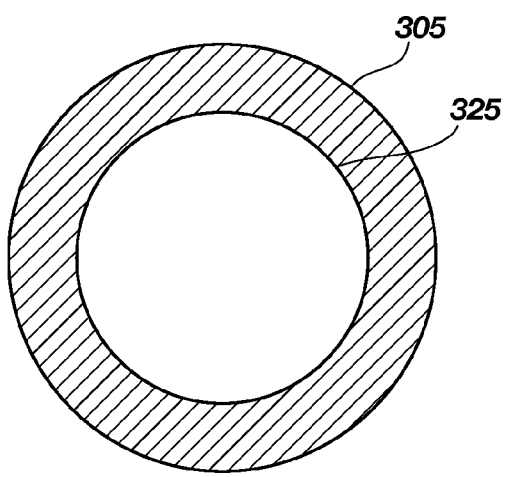
Figure 5D:
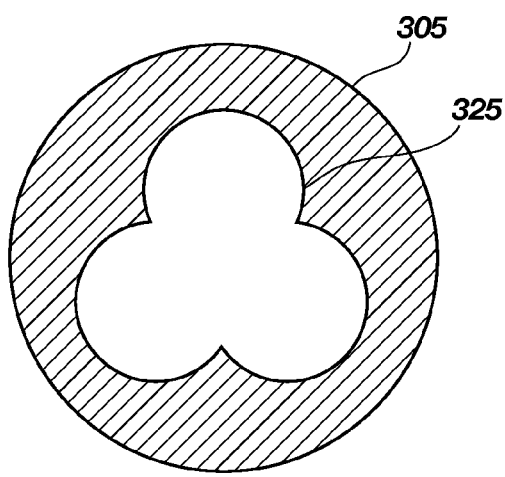

The nozzle insert 300 may comprise an aperture 325 positioned in the body 305 and intersecting a portion of the first end 315 and the second end 320. In some embodiments, the nozzle insert 300 may include a single aperture 325 as illustrated in FIG. 3, while in other embodiments, the nozzle insert 300 may comprise two or more apertures 325, as illustrated in FIG. 4, or the nozzle insert 300 may have no aperture (not shown) such as, for example, when it is desirable to employ the insert as a plug to prevent fluid flow. In embodiments employing either a single aperture or a plurality of apertures 325, the at least one aperture 325 may be configured to direct drilling fluid in a specified direction. A directional flow may be accomplished by any means known to one of ordinary skill in the art. By way of example and not limitation, an inner sidewall 345 of the at least one aperture 325 may comprise an angle (not shown) to direct the drilling fluid (not shown) in a particular direction. Furthermore, the at least one aperture 325 may comprise a generally circular cross section in some embodiments (FIG. 5C). In other embodiments, the at least one aperture 325 may comprise alternative cross-sectional configurations. FIGS. 5A-5D illustrate some non-limiting embodiments of different cross-sectional configurations for the at least one aperture 325, in those embodiments having one or more apertures 325. By way of a non-limiting example, the at least one aperture 325 may comprise a cross-section that is octagonal or other multi-sided geometry (FIG. 5A), oval (FIG. 5B), three-leaf clover (FIG. 5D).

The substantially circumferential groove 330 may encircle a major portion, or all, of body 305 in the outer side surface 335. A first surface 350 of the circumferential groove 330 may be rounded, or sloped in relation to the longitudinal axis 310. The slope of the first surface 350 may be in the direction of the first end 315 such that the first surface 350 forms an acute angle with the longitudinal axis 310. In other words, the first surface 350 may slope generally outward and upward when the nozzle insert 300 is oriented with the first end 315 on top and the second end 320 on the bottom. By way of example and not limitation, the first surface 350 may slope at an angle selected between 10° and 80° in relation to the longitudinal axis 310. In some embodiments, the first surface 350 may comprise an angle between 30° and 60° in relation to the longitudinal axis 310. The angle of the first surface 350 may affect the force necessary to further advance the nozzle insert 300 and may be selected according to the specific application, as will be discussed in greater detail below. A lower or second surface 355 of the circumferential groove 330, longitudinally displaced from the first surface 350 by longitudinally extending side surface 357, may be configured in a manner that will inhibit the nozzle insert 300 from moving upward in response to drilling fluid flow therethrough when a retaining ring such as a resilient split ring is positioned in the circumferential groove 330, as will be described in more detail below. By way of a non-limiting example, the second surface 355 may be substantially perpendicular to the longitudinal axis 310. In other embodiments, as illustrated in FIG. 4, the second surface 355 may be sloped in relation to the longitudinal axis 310, the slope being in a similar direction as the slope of the first surface 350, although not necessarily at the same angle. Both such orientations of second surface 355 may be referred to herein as "substantially transverse" to longitudinal axis 310 and include any orientations which are not sloped toward second end 320.

In addition to the circumferential groove 330, some embodiments of the present invention may comprise one or more additional circumferential grooves 330'. As illustrated in FIG. 3, some embodiments may include at least one additional circumferential groove 330'. Each additional circumferential groove 330' may be configured similar to circumferential groove 330, with a rounded or sloped first surface 350', a substantially transverse second surface 355', and a longitudinally extending side surface 357', as described above.

Figure 6:
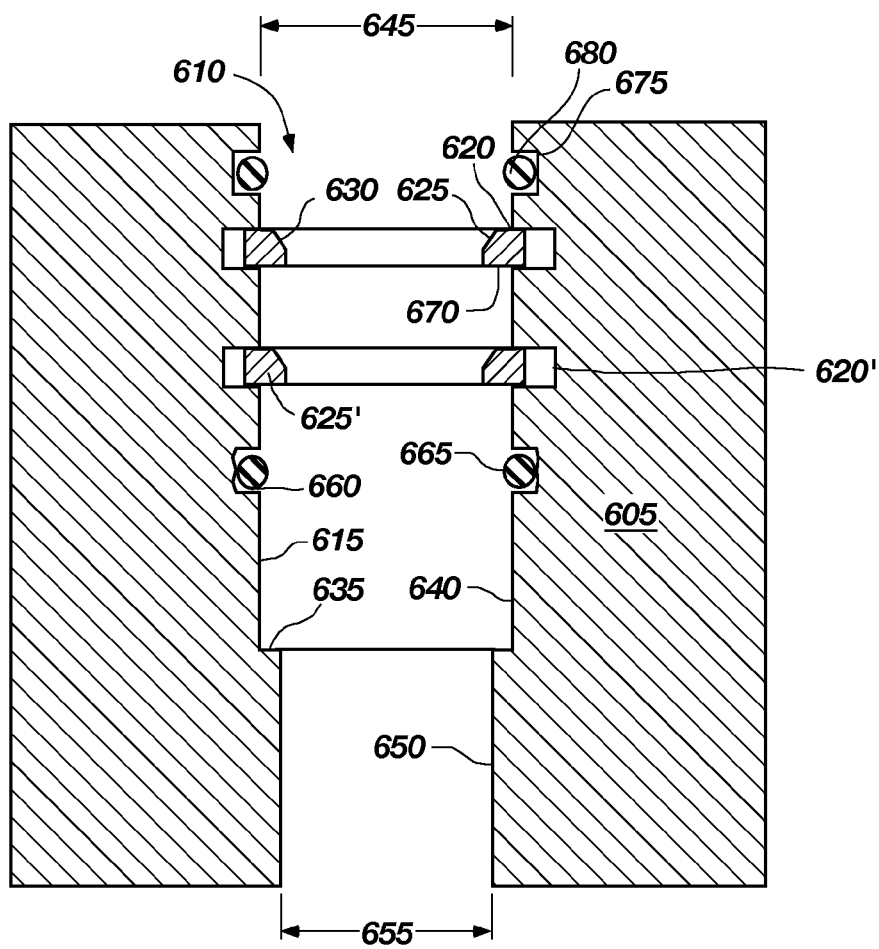
FIG. 6 depicts a cross-sectional view of one embodiment of an aperture for receiving an insertable device in a receiving device.

FIG. 6 depicts an aperture for receiving an insertable device, such as nozzle insert 300 in a receiving device. Referring to FIGS. 3 and 6, the receiving device, configured by way of non-limiting example as an earth-boring tool 605, includes an aperture 610 which comprises a sidewall 615 and an annular recess 620. The annular recess 620 may comprise a peripheral annular groove extending radially from the sidewall 615 and generally normal thereto. The annular recess 620 may be positioned within the aperture 610 such that the annular recess 620 is laterally aligned with the circumferential groove 330 when the nozzle insert 300 is inserted into the aperture 610 to its retention position. In some non-limiting embodiments, the earth-boring tool 605 may include a body comprised substantially of a metal or metal alloy, such as steel. In other non-limiting embodiments, the earth-boring tool 605 may include a body comprised substantially of a particle-matrix composite, such as sintered carbide, or other hard particulate material infiltrated with a metallic binder.

Figure 6A:
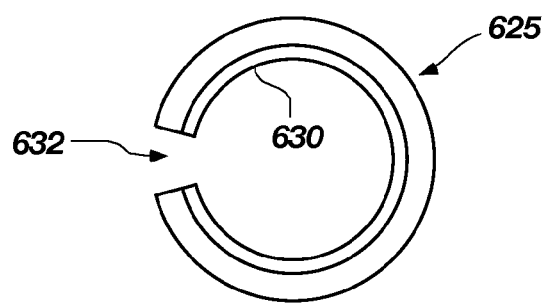
FIG. 6A depicts a top view of an embodiment of a resilient split ring.

With reference to FIGS. 3, 6 and 6A, a resilient split ring 625 may be positioned and retained within the annular recess 620. In some embodiments, resilient split ring 625 may include an optional chamfer 630 along an inner edge. The inner portion of the resilient split ring 625 may be configured to fit into the circumferential groove 330 of nozzle insert 300. Additionally, the optional chamfer 630 and the first surface 350 of circumferential groove 330 may be configured such that the slope of chamfer 630 and the first surface 350 are substantially equivalent. The resilient split ring 625 may comprise a generally circular shape having a cross section comprising any suitable shape. By way of example and not limitation, the cross-section of the resilient split ring 625 may comprise a generally rectangular shape with or without radiused corners, a circular shape with or without flats, and an oval shape with or without flats. The generally circular shape may comprise an outer diameter that is larger than an inner diameter of the aperture 610 and an inner diameter that is smaller than an outer diameter of the nozzle insert 300. The resilient split ring 625 may further include a split or gap 632 in the ring to allow the resilient split ring 625 to deform radially inwardly and outwardly. The resilient split ring 625 may comprise a metal, metal alloy, ceramic, composite, plastic, or other suitable material to enable the resilient split ring 625 to be compressed without significant yielding and to be expanded without significant yielding. One non-limiting example of a suitable material includes a class 2 oil tempered wire per ASTM A229 square wire. In embodiments including chamfer 630, the chamfer 630 may be formed, for example, by drawing the metal wire through a suitably shaped die or by grinding off the corner.

In some embodiments, when a nozzle insert includes two or more circumferential grooves 330, 330', the aperture 610 may comprise two or more annular recesses 620, 620' with an associated resilient split ring 625, 625'. Each annular recess 620' and resilient split ring 625' may be configured similar to annular recess 620 and resilient split ring 625, as described above. Each annular recess 620' and resilient split ring 625' may be positioned to fit each resilient split ring 625' into an associated circumferential groove 330' of nozzle insert 300.

The aperture 610 may further include a depth control structure to limit the depth to which the nozzle insert 300 may be positioned therein. A non-limiting example of a depth control structure comprises an annular shoulder 635 within the aperture 610 configured to limit the depth to which the nozzle insert 300 may be positioned therein, to prevent the nozzle insert 300 from falling into a fluid passage or plenum in communication with aperture 610 and through which drilling fluid is furnished during operation of the earth-boring tool 605. As a non-limiting example, the annular shoulder 635 may be formed by a change in cross-sectional dimensions within the aperture 610. For example, the aperture 610 may comprise a first portion 640 having a first cross-sectional dimension 645, and a second portion 650 having a second, smaller cross-sectional dimension 655. The annular shoulder 635 may comprise a flat at the intersection of the first portion 640 and the second portion 650.

In some embodiments, one or more seal structures may be provided for inhibiting the drilling fluid from flowing between the sidewall 615 and the outer side surface 335 of nozzle insert 300. In one embodiment, a seal structure may be positioned upstream (as the fluid flows into the aperture) from the one or more annular recesses 620, 620' to inhibit the drilling fluid from flowing around the outer side surface 335 of nozzle insert 300. In another embodiment, a seal structure may be positioned downstream from the one or more annular recesses 620, 620' to prevent the drilling fluid and/or rock particulates from entering between the sidewall 615 and the outer side surface 335 of nozzle insert 300 after impingement on a formation being drilled. Some embodiments may comprise both an upstream seal structure and a downstream seal structure.

In an embodiment in which the seal structure is positioned upstream from the one or more annular recesses 620, 620', the seal structure may comprise a second annular recess 660 in aperture 610, the second annular recess 660 extending radially into the sidewall 615 and generally normal thereto. An annular seal 665, such as an elastomeric O-ring or other seal suitable for the conditions of the borehole (high temperature, corrosive, etc.) as is well known to those of ordinary skill in the art may be positioned in the second annular recess 660.

In embodiments in which the seal structure is positioned downstream from the one or more annular recesses 620, 620', the seal structure may comprise a third annular recess 675 in aperture 610, the third annular recess 675 extending radially into the sidewall 615 and generally normal thereto. A second annular seal 680 may be positioned in the third annular recess 675. The second annular seal 680 may comprise an elastomeric O-ring or other seal suitable for the conditions of the borehole as is well known to those of ordinary skill in the art. The downstream seal structure may not be configured to withstand the large pressure drops experienced by the upstream seal structure. Instead, the downstream seal structure may be configured to prevent the splash-back drilling fluid and/or rock particulates from the formation being drilled from entering and packing the annular recess 620 behind the resilient split ring 625.

A suitably configured nozzle insert 300 may be selected to provide specific hydraulic characteristics according to specific service conditions and may be inserted and secured within the aperture 610. FIGS. 7A-7C depict the insertion of an insertable device into the aperture 610 of a receiving device. The resilient split ring 625 may be positioned at least partially into the annular recess 620 formed in the sidewall 615 of aperture 610, the nozzle insert 300 may be inserted into the aperture 610, and the substantially circumferential groove 330 of the nozzle insert 300 may be aligned with the resilient split ring 625 such that the resilient split ring 625 at least partially contracts into the circumferential groove 330 when aligned therewith.

The resilient split ring 625 may be installed into the annular recess 620 by compressing its outer periphery to an outer diametric dimension less than the cross-sectional dimension 645 (FIG. 6) of the aperture 610. The resilient split ring 625 may then be slid into the aperture 610, and permitted to expand partially into the annular recess 620. By way of example and not limitation, the resilient split ring 625 may be grasped by a user, holding the gap 632 between the user's fingers. The edge opposite the gap 632 may be inserted into the aperture 610, to compress the resilient split ring 625 and narrow or eliminate the gap 632. The resilient split ring 625 is pushed deeper into the aperture 610 until it nears the annular recess 620. The resilient split ring 625 may be rotated approximately ninety degrees and moved farther into the aperture 610 until the resilient split ring 625 snaps into the annular recess 620.

In embodiments employing a seal structure and/or a second seal structure, the annular seal 665 and/or the second seal may also be installed. The annular seal 665 may be installed into the second annular recess 660 by positioning the annular seal 665 within the aperture 610 and sliding the annular seal 665 until it seats into second annular recess 660. The second annular seal 680 may be installed into the third annular recess 675 by positioning the second annular seal 680 within the aperture 610 and sliding the second annular seal 680 until it seats into the third annular recess 675. The annular seal 665 and/or second annular seal 680 may be fully positioned by rotating an object (e.g., a finger) around the circumference of the aperture 610 at the location of the second annular recess 660 and/or third annular recess 675. Although the present invention has been described using one or two separate resilient retaining rings and one or two sealing elements, it should be appreciated that the invention also anticipates the use of multiple resilient retaining rings and sealing elements in any combination.

The second end 320 of the nozzle insert 300 may then be inserted downwardly in the direction of arrow 705, through the resilient split ring 625 to expand the resilient split ring 625 about the outer side surface 335 of the nozzle insert 300. In embodiments comprising the bevel 340, the bevel 340 may contact the resilient split ring 625, with or without the chamfer 630, to facilitate the expansion. In embodiments which do not include the bevel 340, the second end 320 may contact the chamfer 630 on resilient split ring 625 to facilitate the expansion. As the resilient split ring 625 expands, the outer diameter thereof extends laterally into annular recess 620. The nozzle insert 300 is then moved farther into aperture 610 until the substantially circumferential groove 330 aligns with annular recess 620. As the substantially circumferential groove 330 aligns with annular recess 620, the resilient split ring 625 partially contracts into circumferential groove 330 while remaining partially disposed in the surrounding annular recess 620, snapping into place and effectively locking the nozzle insert 300 into the aperture 610. In embodiments employing a seal structure, when the nozzle insert 300 is positioned into place, the annular seal 665 is compressed between the second annular recess 660 and the outer side surface 335 of the nozzle insert 300 to effectively seal off and inhibit the flow of drilling fluid around the outer side surface 335 of the nozzle insert 300.

As described above, the annular shoulder 635 within aperture 610 prevents the nozzle insert 300 from being positioned too far within the aperture 610 and from falling into a fluid passage or plenum in communication with aperture 610. As will be described in more detail below, the annular shoulder 635 is positioned longitudinally spaced from the second end 320 when the nozzle insert 300 is positioned and locked into place.

The nozzle insert 300 is shown comprising a substantially flat second surface 355 of the circumferential groove 330, transverse to the longitudinal axis 310, which contacts the radially inner portion of the resilient split ring 625. The geometry of the second surface 355 in conjunction with the substantially aligned, flat lower surface 670 of resilient split ring 625 prevents the nozzle insert 300 from being pushed out of the aperture 610 by forces generated by a pressure drop across the nozzle insert 300 when drilling fluid flows through the aperture 610. Thus, the nozzle insert 300 is retained in place during use.

The configuration of substantially circumferential groove 330 may be such that when the resilient split ring 625 is in communication therewith the resilient split ring 625 is prevented from fully returning to its unloaded, i.e., unexpanded, state. Thus, the resilient split ring 625 may maintain a force which may at least somewhat limit the rotatability of the nozzle insert 300 in the aperture 610.

Figure 8C:
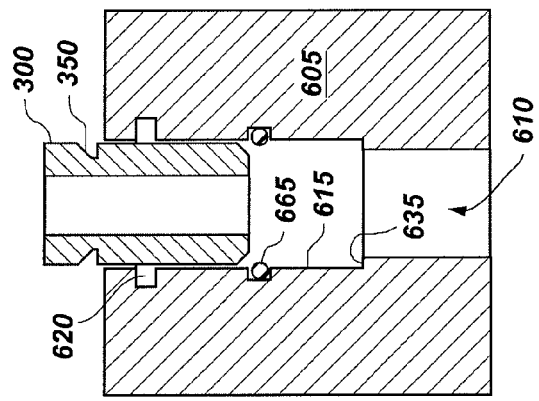
FIGS. 8A-8C are cross-sectioned views depicting the removal of an insertable device from an aperture of a receiving device according to one embodiment.
Figure 8B:
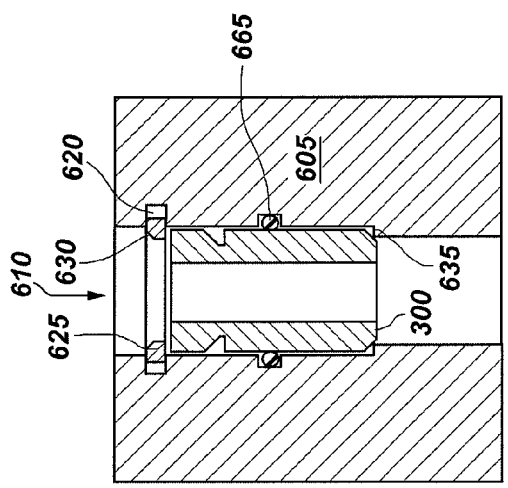
Figure 8A:
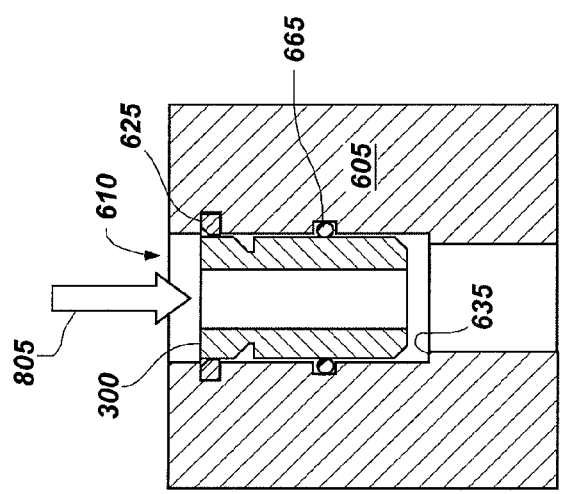

The nozzle insert 300 may further be removed from aperture 610 to allow the nozzle insert 300 to be replaced. FIGS. 8A-8C illustrate the removal of an insertable device configured as a nozzle insert 300 from the aperture 610 in a receiving device configured as an earth-boring tool. The nozzle insert 300 may be advanced in the aperture 610 until it is located below the resilient split ring 625. The resilient split ring 625 may then be removed from the aperture 610, as well as the nozzle insert 300.

Advancing the nozzle insert 300 into the aperture 610 in the insertion direction as depicted by arrow 805, may be accomplished by applying a sufficient force in the insertion direction to cause the resilient split ring 625 to expand about the outer side surface 335 of nozzle insert 300 and extend into the annular recess 620. The slope of the first surface 350 of the circumferential groove 330 allows the resilient split ring 625 to expand and the nozzle insert 300 to advance. The slope of the first surface 350 may determine the amount of force that is necessary to further advance the nozzle insert 300 and may be selected in order to tailor the force necessary to advance according to the specific application. For example, if the nozzle insert 300 will be subject to significant pressures or pressure surges in the insertion direction while in use, the slope of the first surface 350 may be selected which will retain the nozzle insert 300 in place until a force is applied which is greater than the forces to which the nozzle insert 300 is exposed during use. In embodiments that may include the chamfer 630 along the inner top edge of the resilient split ring 625, the chamfer 630 may aid in this expansion of the resilient split ring 625 and advancement of nozzle insert 300. The nozzle insert 300 is advanced to a position in which the resilient split ring 625 is exposed for removal (FIG. 8B).

The annular shoulder 635 within the aperture 610 may be configured to limit the depth to which the nozzle insert 300 may be positioned to expose the resilient split ring 625. The depth, therefore, of the annular shoulder 635 is sufficient to allow the nozzle insert 300 to be advanced far enough to expose the resilient split ring 625 while simultaneously preventing the nozzle insert 300 from falling into a fluid passage or plenum. In embodiments employing more than one resilient split ring, the depth of the annular shoulder 635 is sufficient to allow the nozzle insert 300 to be advanced far enough to expose each of the plurality of resilient split rings 625, 625'.

The resilient split ring 625 may be removed from the aperture 610 by compressing the resilient split ring 625 so its outer periphery has an outer diametric dimension less than the cross-sectional dimension 645 (FIG. 6) of the aperture 610. The resilient split ring 625 may then be removed from the aperture 610. As described above, the annular recess 620 is of greater diameter than the outer diameter of the resilient split ring 625. The oversized nature of the annular recess 620 may allow the resilient split ring 625 to be sufficiently moved off-center during removal to fully expose the ring ends. By way of example and not limitation, in embodiments providing adequate clearance, the resilient split ring 625 may be removed by inserting the tip of a screwdriver (not shown) into the space created between the outer diameter of the resilient split ring 625 and the aperture sidewall 615 when the resilient split ring 625 is off center. The screwdriver may be twisted to compress the resilient split ring 625 so the outer diameter thereof is less than the cross-sectional dimension 645. With the resilient split ring 625 removed from the aperture 610, the nozzle insert 300 may be readily removed from the aperture 610 by sliding the nozzle insert 300 upward.

In embodiments employing a seal structure, the annular seal 665 may also be removed for replacement. By way of example and not limitation, a lever tool of appropriate geometry (e.g., a screwdriver, not shown) may also be employed to remove the annular seal 665 from within the second annular recess 660, the annular seal 665 then being removed from the aperture 610.

FIGS. 7A-8C illustrate embodiments of an aperture 610 comprising a single resilient split ring 625 and a single seal structure. It should be apparent to those of ordinary skill in the art that additional resilient split rings and seals may be inserted and removed in a manner similar to that described above for a single resilient split ring and seal. For example, additional resilient split rings may be inserted and removed in the same or similar manner as the resilient split ring 625 above. Furthermore, for an additional seal structure, the second annular seal 680 may be inserted and removed in a manner similar to that described for inserting the annular seal 665.

As discussed above, the nozzle insert 300 and the earth-boring tool 605 may comprise any of a number of materials. Forming a particle-matrix composite nozzle insert 300 or earth-boring tool 605 having the respective features described above may be carried out using conventional manufacturing techniques readily known to one of ordinary skill in the art. Such methods may include, but are not limited to, infiltration methods (in which hard particles (e.g., tungsten carbide) are infiltrated by a molten liquid metal matrix material (e.g., a copper based alloy) within a refractory mold), by hot isostatic pressing (HIP) of a powder mass, or by pressing a powder mixture to form a green powder compact, and sintering the green powder compact to a final density. The green powder compact may be machined as necessary or desired prior to sintering using conventional machining techniques. Furthermore, additional machining processes may be performed after sintering the green powder compact to a partially sintered brown state, or after sintering the green powder compact to a desired final density.

While the present invention has been described with embodiments in which the insertable device is embodied as a nozzle insert and the receiving device is embodied as an earth-boring tool, it should be understood that the present invention is not so limited. Indeed, those of ordinary skill in the art will recognize that the insertable device may comprise any device to be retained in a receiving device, and the receiving device may comprise any device configured for receiving and retaining the insertable device. By way of example and not limitation, the present invention may be employed for retaining shafts or plugs in any suitable structure. Furthermore, an aperture 325 in the insertable device may be configured as an aperture 610 in a receiving device as described above for receiving another insertable device therein. In this manner, embodiments of the present invention may comprise a telescoping apparatus in which a series of insertable devices may be configured to extend to a fixed and locked length and then collapsed back down.

Furthermore, in addition to the materials described above, the insertable device and the receiving device may comprise various other suitable materials depending on the specific application, such as composites and plastics in addition to metals.

Therefore, while certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and equivalents, of the claims which follow.

What is claimed is:

1. A nozzle insert for an earth-boring tool, comprising:
    a body extending along a longitudinal axis and comprising
        a first longitudinal end and an opposing second longitudinal end; and
    at least one substantially circumferential groove in an outer side surface of the body between the first longitudinal end and the second longitudinal end, the at least one substantially circumferential groove comprising:
        a first surface sloping in the direction of the outer side surface and the first longitudinal end and forming an acute angle with the longitudinal axis; and
        a second surface substantially transverse to the longitudinal axis.

2. The nozzle insert of claim 1, wherein the body is comprised of at least one of a ceramic, a metal, a metal alloy, a particle-matrix composite, a fiber-matrix composite, and a plastic.

3. The nozzle insert of claim 1, wherein the body is of circular configuration in cross section transverse to the longitudinal axis.

4. The nozzle insert of claim 1, wherein the body further comprises a bevel at an outer peripheral edge of the second longitudinal end.

5. The nozzle insert of claim 1, wherein the second surface of the at least one substantially circumferential groove is oriented either substantially perpendicular to the longitudinal axis or sloping in the direction of the first longitudinal end to form an acute angle with the longitudinal axis.

6. The nozzle insert of claim 1, further comprising at least one aperture extending longitudinally through the body and intersecting at least a portion of the first longitudinal end and at least a portion of the second longitudinal end.

7. The nozzle insert of claim 6, wherein the at least one aperture comprises at least one of a round, oval, rectangular and multi-sided cross section transverse to the longitudinal axis.

8. The nozzle insert of claim 6, wherein the at least one aperture comprises a sidewall and at least one annular recess extending radially into the sidewall and generally normal thereto.

9. The nozzle insert of claim 6, wherein the at least one aperture is configured and oriented to direct a fluid in a specific direction.

10. The nozzle insert of claim 6, wherein the at least one aperture comprises two or more apertures.

11. An earth-boring tool, comprising:
an aperture extending into an earth-boring tool, the aperture including a sidewall and at least one annular recess extending radially into the sidewall and generally normal thereto;
a nozzle insert positionable into the aperture and comprising:
a body comprising a first longitudinal end and an opposing second longitudinal end; and
at least one substantially circumferential groove in an outer side surface of the body between the first longitudinal end and the second longitudinal end, the at least one substantially circumferential groove comprising a first surface sloping in the direction of the outer side surface and the first longitudinal end and forming an acute angle with a longitudinal axis of the body, and a second surface substantially transverse to the longitudinal axis; and
at least one resilient split ring extending into both the at least one substantially circumferential groove in the nozzle insert and the at least one annular recess in the aperture.

12. The earth-boring tool of claim 11, wherein the body is comprised of at least one of a ceramic, a metal, a metal alloy, a particle-matrix composite, a fiber-matrix composite, and a plastic.

13. The earth-boring tool of claim 11, wherein the at least one resilient split ring comprises a chamfered inner edge facing a mouth of the aperture.

14. The earth-boring tool of claim 11, wherein the nozzle insert further comprises at least one aperture extending longitudinally through the body and intersecting at least a portion of the first longitudinal end and at least a portion of the second longitudinal end.

15. The earth-boring tool of claim 14, wherein the at least one aperture comprises a sidewall and at least one annular recess extending radially into the sidewall and generally normal thereto.

16. The earth-boring tool of claim 11, further comprising a depth control structure configured to limit the depth to which the nozzle insert is positionable within the aperture.

17. The earth-boring tool of claim 16, wherein the depth control structure comprises an annular shoulder.

18. The earth-boring tool of claim 17, wherein the annular shoulder comprises a region of the aperture in which a first, outer portion having a first cross-sectional dimension and a second, inner portion having a second, smaller cross-sectional dimension intersect.

19. The earth-boring tool of claim 11, further comprising at least one seal structure configured to inhibit flow of a drilling fluid between the outer side surface of the nozzle insert and the sidewall of the aperture.

20. The earth-boring tool of claim 19, wherein the at least one seal structure is located in a position consisting of at least one of upstream and downstream from the at least one annular recess.

21. The earth-boring tool of claim 19, wherein the at least one seal structure comprises:
a plurality of annular recesses extending radially into the sidewall; and
a seal positioned in each of the plurality of annular recesses and compressed between the sidewall and the outer side surface of the nozzle insert.

22. The earth-boring tool of claim 11, comprising:
a plurality of annular recesses;
a plurality of substantially circumferential grooves; and
a plurality of resilient split rings;
wherein the number of annular recesses of the plurality, substantially circumferential grooves of the plurality, and resilient split rings of the plurality are equal.

23. A method of inserting a nozzle insert in an earth-boring tool, comprising:
positioning at least one resilient split ring at least partially into at least one annular recess in a sidewall of an aperture in an earth-boring tool;
positioning a second end of a nozzle insert into the aperture through the resilient split ring to expand the resilient split ring, the nozzle insert comprising at least one substantially circumferential groove in an outer side surface thereof, the at least one substantially circumferential groove including a first surface sloping in the direction of the outer side surface and a first end opposite from the second end, and a second surface substantially transverse to the sidewall; and
aligning the at least one substantially circumferential groove of the nozzle insert with the at least one resilient split ring such that the expanded at least one resilient split ring at least partially contracts into the at least one substantially circumferential groove.

24. The method of claim 23, wherein positioning the at least one resilient split ring at least partially into the at least one annular recess comprises:
compressing an outer periphery of the at least one resilient split ring to an outer diametric dimension less than a cross-sectional dimension of the aperture;
sliding the at least one resilient split ring into the aperture; and
expanding the at least one resilient split ring into the at least one annular recess.

25. The method of claim 23, wherein positioning a nozzle insert into the aperture through the at least one resilient split ring to expand the at least one resilient split ring comprises:
   forcing the nozzle insert through a center of the at least one resilient split ring; and
   expanding the at least one resilient split ring about the outer side surface of the nozzle insert and into the at least one annular recess in the sidewall of the aperture.

26. The method of claim 23, further comprising:
   positioning at least one seal into at least a second annular recess in the sidewall of the aperture; and
   positioning the nozzle insert into the aperture so that the at least one seal is compressed between the at least a second annular recess and the outer side surface of the nozzle insert.

27. An apparatus, comprising:
   a receiving device comprising an aperture extending therein, the aperture including a sidewall and at least one annular recess extending radially into the sidewall and generally normal thereto;
   an insertable device positionable into the aperture and comprising:
      a body comprising a first longitudinal end and an opposing second longitudinal end; and
      at least one substantially circumferential groove in an outer side surface of the body between the first longitudinal end and the second longitudinal end, the at least one substantially circumferential groove comprising a first surface sloping in the direction of the outer side surface and the first longitudinal end and forming an acute angle with a longitudinal axis of the body, and a second surface substantially transverse to the longitudinal axis; and
   at least one resilient split ring extending into both the at least one substantially circumferential groove in the insertable device and the at least one annular recess in the aperture.

* * * * *